No. 854,754. PATENTED MAY 28, 1907.
J. E. MILLER.
WHEELED CULTIVATOR.
APPLICATION FILED OCT. 8, 1906.
4 SHEETS—SHEET 3.
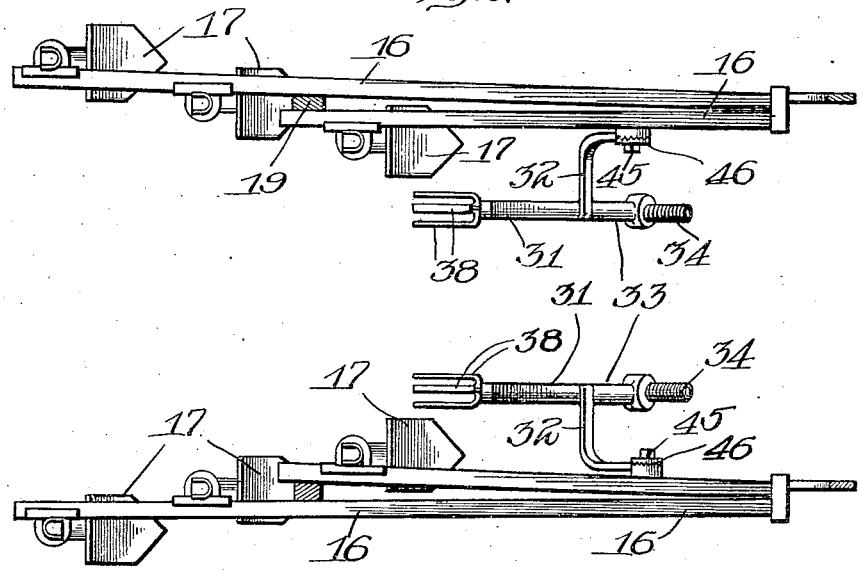
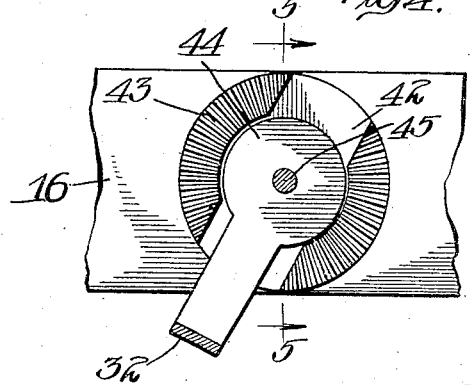
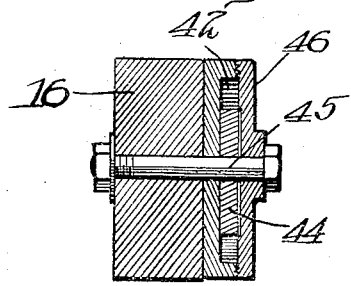
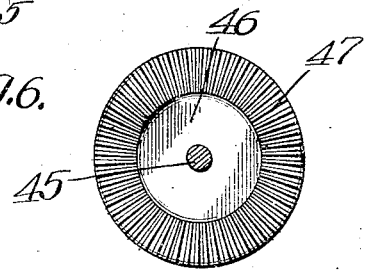
Witnesses:
G. V. Dimarus.
W. P. Kilroy.
Inventor:
John E. Miller
Bond Adams Pickard & Jackson
Attys No. 854,754.
PATENTED MAY 28, 1907.
J. E. MILLER.
WHEELED CULTIVATOR.
APPLICATION FILED OCT. 8, 1906.
4 SHEETS—SHEET 4.
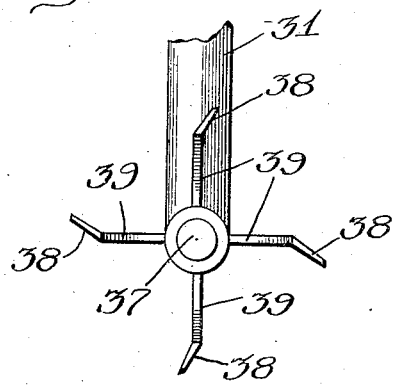
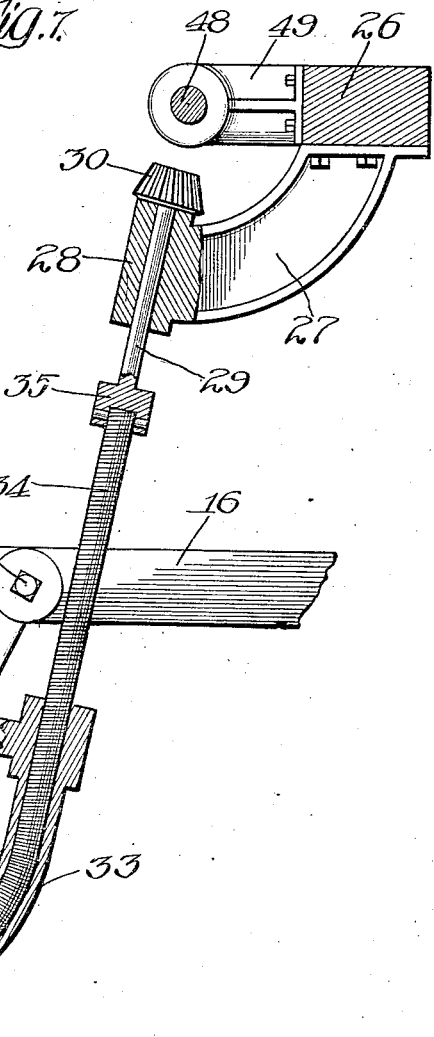
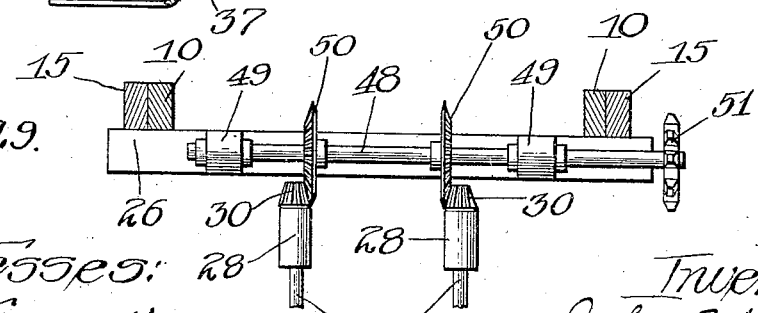
Witnesses:
G. V. Domarus.
W. P. Kilroy
Inventor:
John E. Miller

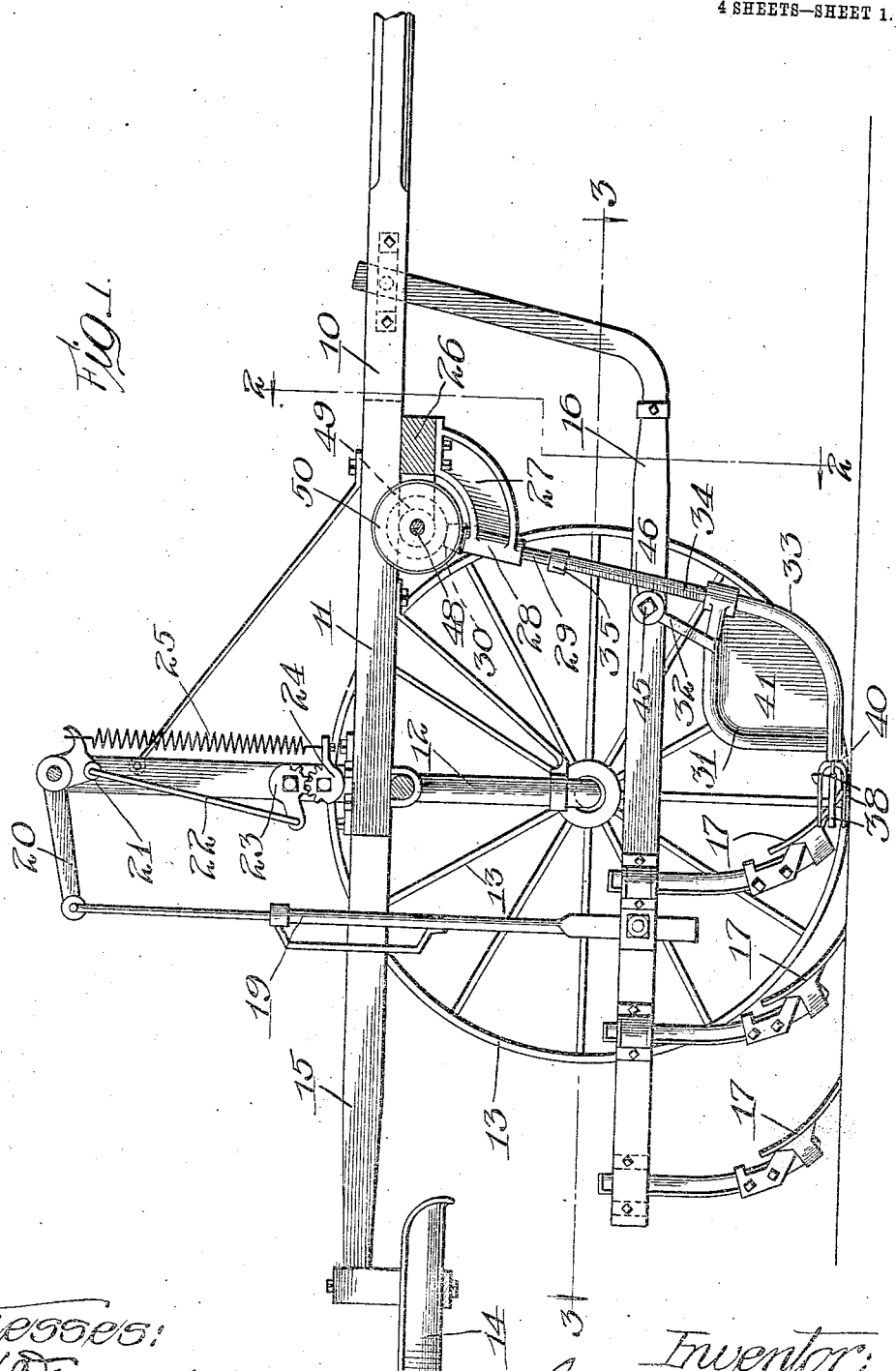

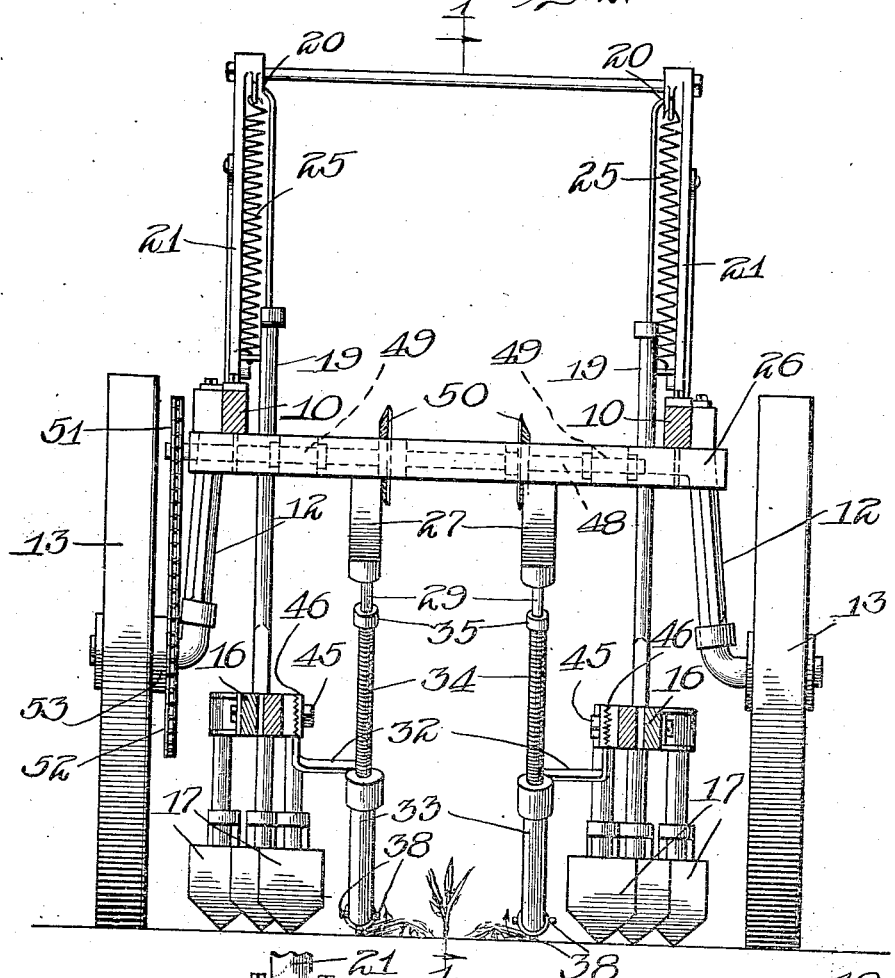

UNITED STATES PATENT OFFICE.

JOHN E. MILLER, OF WESTERN SPRINGS, ILLINOIS.

WHEELED CULTIVATOR.

No. 854,754.      Specification of Letters Patent.      Patented May 28, 1907.

Application filed October 8, 1906. Serial No. 338,004.

*To all whom it may concern:*

Be it known that I, JOHN E. MILLER, a citizen of the United States, residing at Western Springs, in the county of Cook and State of Illinois, have invented certain new and useful Improvements in Wheeled Cultivators, of which the following is a specification, reference being had to the accompanying drawings.

My invention relates to wheeled cultivators, and its object is to provide a new and improved attachment to a wheeled cultivator by means of which the dirt may be operated upon by a revolving agitator between the shovel-blades and the corn in order to more completely pulverize and break up the dirt and throw part of it over toward the rows of corn. It further tends to break down the weeds and remove them, thus insuring a better growth and more perfect cultivation.

In the drawings,—Figure 1 is a central vertical section through the cultivator on line 1—1 of Fig. 2; Fig. 2 is a front view, being a cross section on line 2—2 of Fig. 1; Fig. 3 is a horizontal section on line 3—3 of Fig. 1; Fig. 4 is an enlarged detail, showing the mechanism by which my improved agitator is secured to the shovel-beams; Fig. 5 is an enlarged detail, being a cross-section on line 5—5 of Fig. 4; Fig. 6 is an enlarged detail, being a view of the inner side of one of the locking plates by means of which the frame for the agitator is secured to the cultivator beam; Fig. 7 is an enlarged detail, being a view of the agitator and its connections partly in section; Fig. 8 is an enlarged detail, being an end view of the agitator; Fig. 9 is a detail, being a view of the driving-shafts and the upper ends of the connections between the agitators and said driving shaft; and Fig. 10 is an enlarged detail, showing the sprocket and chain connections.

Referring to the drawings,—10 represents the tongue, and 11 the frame of a cultivator which rests upon a bent axle 12 supported by wheels 13.

14 indicates a seat, which is supported from suitable supports 15.

16 indicates the shovel-beams, and 17 the shovels of a cultivator.

19 indicates rods, which are connected at their lower ends to the shovel-beams and at their upper ends to bell-crank levers 20 mounted upon suitable supports 21 on the cultivator frame.

22 indicates a link, which is pivotally connected at one end with the bell-crank lever 20 and at the other end with a mutilated-gear 23, which is pivoted on the supports 21 and meshes with another mutilated gear 24 also supported upon the supports 21.

25 indicates springs, which connect the bell-crank lever 20 and the mutilated-gear 24.

All of the parts above described, as illustrated in the drawings, are of well-known structure and operation and form no part of my present invention. Indeed, other forms of wheeled cultivators may be used,—the form illustrated in the drawings being shown for convenience of illustration.

26 indicates a cross-beam secured to the lower side of the frame 11.

27 indicates castings, which are bolted or otherwise secured to the cross-beam 26 and are provided upon their free ends with sleeves 28.

29 indicates shafts, which are journaled in the sleeves 28 and which carry upon their upper ends bevel-gears 30.

31 indicates frames, which are secured to and carried by the shovel beams 16 by means of an arm 32 which is secured to the beams 16 in the manner hereinafter described. The forward portion 33 of the frame 31 is formed of tubing or is bored to permit the operation within it of a flexible shaft 34, the upper end of which is pinned or otherwise suitably connected to a head 35 upon the lower end of the shaft 29.

36 indicates a rotatable agitator, which is journaled by a suitable stem 37 in the lower rear portion of the frame 31. The stem 37 is pinned or in any other suitable way connected with the flexible shaft 34. The agitator 36, as is best shown in Figs. 7 and 8, consists of a plurality of knife-like blades 38 connecting by radial arms 39 with a head 40 into which the stem 37 is pinned or otherwise secured.

41 indicates a plate, which is preferably separate from the frame 31 and fills in the space in the frame to prevent the accumulation and gathering of weeds on said frame.

The mechanism for supporting the frame 31 on the shovel-beams 16 is best shown in Figs. 4, 5 and 6. Referring to those figures, 42 indicates a circular plate, which is recessed, as is best shown in Figs. 4 and 5, to receive the end of the arm 32 and is provided upon its outer surface with teeth 43. The arm 32 is provided with an expanded head 44, which is for the greater part of its shape circular and rests within the recess in the plate 42,—it being supported therein by means of a bolt 45. 46 indicates a circular plate adapted to fit over the plate 42 and provided on its inner surface with engaging-teeth 47 adapted to engage the teeth 43 on the plate 42. The recess in the plate 42 is so shaped, as is best shown in Fig. 4, to permit a slight play of the arm 32 therein.

By reference to Figs. 4 and 5 it will be seen that when the arm 32 is placed upon the bolt 45 and the outer plate 47 placed in position and the whole bolted together, the arm 32 will be firmly secured to the shovel beams, allowing by virtue of the play of the arm 32 in the recess of the plate 42 a slight motion of the frame 31 independently of the rise and fall of the shovel beams.

As is best shown in Figs. 2 and 3, the frame is supported inside of the shovel beams in such a position that when the shovel beams are lowered to permit the plows to operate the agitator 36 lies close along the surface of the ground. It is, of course, obvious that when the shovel beams are raised or lowered by the arms shown in the drawings, or by any other appropriate mechanism, the frame 31 and the agitator 38 will rise and fall with them with a slight play, as has been above described.

Referring particularly to Figs. 2, 9 and 10, where these parts are best shown, 48 indicates a shaft, which is journaled in suitable bearings 49 on the rear of the cross-beam 26 and is provided with bevel-gears 50 keyed or otherwise secured to the shaft, which mesh with the bevel-gears 30 on the end of the shaft 29. 51 indicates a sprocket-wheel, which is secured to one end of the shaft 48 near one of the carrying-wheels 13. 52 indicates a sprocket-wheel, which is secured to the hub 53 of one of the wheels 13 and upon the inside thereof in alinement with the sprocket-wheel 51. 54 indicates a sprocket-chain, which connects the sprocket-wheels 51 and 52. In order to allow for the spring of the cultivator frame and of the bent axle 12, and preserve proper distances, the sprocket-chain 54 passes over idler-rollers 55 which are mounted upon the ends of an arm 56 secured to the bent axle 12.

The operation of the above-described devices is as follows:—When the shovel beams are lowered to cultivate the corn and the frame 31, as has been said, is lowered with them, the agitator 38 lies close along the ground so as to engage the dirt that is thrown up by the shovels,—the agitator, as is best shown in Fig. 3, lying just inside of the forward and inner shovels and between them and the row of corn to be cultivated. When the machine is driven forward, the rotation of the carrying-wheels 13 rotates the sprocket wheel 52, and the rotation is communicated by the sprocket-chain 54 to the sprocket-wheel 51, and thence to the shaft 48. By means of the bevel-gears 30 and 50 this rotation is communicated to the shafts 29 and thence by means of the flexible shafts 34 to the agitators 36 which are thus caused to rotate rapidly in the direction shown by arrows in Fig. 1,—that is to say, the blades rotate from the bottom of the agitator toward the corn. The agitators thus rotating will engage and break down weeds, which are not otherwise broken down by the shovels, and at the same time will more completely break up the dirt and throw it over toward the corn.

I have shown and described my cultivator as used for cultivating "corn", but of course it will be understood that it may be used for cultivating other plants.

That which I claim as my invention and desire to secure by Letters Patent is,—

1. In a wheeled cultivator, the combination with shovel-beams and shovels secured thereto, of a rotating agitator carried by said shovel-beams and adapted to engage the ground between the shovels and the corn and throw the dirt toward said corn, and means for rotating said agitator.

2. In a wheeled cultivator, the combination with supporting-wheels, shovel-beams and shovels depending therefrom, of frames carried by said shovel-beams, rotating agitators journaled in said frames and adapted to engage the ground between the shovels and the corn and throw the dirt toward said corn, and connections between said rotating agitators and said wheels adapted to rotate said agitators.

3. In a wheeled cultivator, the combination with supporting-wheels, a shovel-beam and shovels mounted thereon, a frame carried by said shovel-beam, a rotatable agitator journaled in said frame and adapted to engage the ground between the shovels and the corn, a flexible shaft journaled in said frame and connected with said agitator, and connections between said flexible shaft and said supporting-wheels whereby said agitator is rotated from said supporting-wheels.

JOHN E. MILLER.

Witnesses:
 MINNIE A. HUNTER,
 CHARLES E. PICKARD.